(12) United States Patent
Lukaszew et al.

(10) Patent No.: US 6,535,365 B1
(45) Date of Patent: Mar. 18, 2003

(54) MAGNETIC TUNNELING STRUCTURE HAVING FERROMAGNETIC LAYERS OF DIFFERENT CRYSTALLOGRAPHIC STRUCTURE

(75) Inventors: Rosa A. Lukaszew, St. Clair Shores, MI (US); Yongning Sheng, Ann Arbor, MI (US); Roy Clarke, Ann Arbor, MI (US); Ctirad Uher, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/505,885

(22) Filed: Feb. 17, 2000

(51) Int. Cl.[7] ................................................. G11B 5/33
(52) U.S. Cl. .................................................. 360/324.2
(58) Field of Search ........................ 360/324.2; 324/252

(56) References Cited

U.S. PATENT DOCUMENTS

| | | | | |
|---|---|---|---|---|
| 5,726,837 A | * | 3/1998 | Nakatani et al. ......... | 360/324.2 |
| 5,856,008 A | * | 1/1999 | Cheong et al. ............. | 428/402 |
| 5,966,012 A | * | 10/1999 | Parkin ........................ | 324/252 |
| 6,011,674 A | * | 1/2000 | Nakatani et al. ......... | 360/324.2 |
| 6,108,177 A | * | 8/2000 | Gill ........................ | 360/324.12 |
| 6,181,537 B1 | * | 1/2001 | Gill ........................ | 360/324.2 |
| 6,183,859 B1 | * | 2/2001 | Chen et al. ................. | 428/332 |
| 6,185,080 B1 | * | 2/2001 | Gill ........................ | 360/324.2 |

* cited by examiner

Primary Examiner—Jefferson Evans
(74) Attorney, Agent, or Firm—Fleshner & Kim, LLP

(57) ABSTRACT

A magnetic tunneling structure formed of first and second ferromagnetic layers and a insulating tunneling barrier layer sandwiched therebetween. The first and second ferromagnetic layers are preferably formed of the same ferromagnetic material, but have different crystallographic structures. The insulating tunneling barrier layer is preferably a nitride layer, for example, boron nitride, formed on the first ferromagnetic layer.

36 Claims, 8 Drawing Sheets

MAGNETIC TUNNELING STRUCTURE HAVING FERROMAGNETIC LAYERS OF DIFFERENT CRYSTALLOGRAPHIC STRUCTURE

This invention was made with Government support under Grant No. N00014-92-J-1335 awarded by the Office of Naval Research. The Government has certain tights in the invention.

BACKGROUND OF THE INVENTION

1. Field of the Invention

The present invention relates to a magnetic tunneling structure, and in particular a magnetic tunneling structure formed of two magnetic layers having an insulating tunneling barrier layer sandwiched therebetween.

2. Background of the Related Art

Magnetic storage technology is currently enjoying a 60% compound annual growth rate, with data rate increases of 30–40% per year. This has enabled the hard disk drive industry to drive storage costs down by approximately 40% per year. This rate of improvement shows no signs of diminishing and promises to continue at the present rate or even to accelerate.

While many factors such as fly height, media, etc. can also be improved, magnetic recording heads capable of higher speeds and densities are the key to continuing this trend. The magnetic sensing used so far, is done by a change in magnetoresistance (MR) induced in the sensing head. Research on magnetoresistance has been particularly active in recent years towards this goal. The materials explored so far exploit the giant magnetoresistance (GMR) effect in heterogeneous magnetic systems, such as layered and granular solids, where the dominant mechanism responsible for GMR is spin-dependent electron scattering, which is greatly enhanced in heterogeneous media. To extend the recording density beyond approximately 10 Gbytes/in$^2$, a current perpendicular to the plane (CPP) mode GMR head was proposed in 1995. GMR materials in this configuration have low electrical impedance complicating their use in disk drives. A second type of magnetoresistance effect occurs in manganese perovskites. These materials display even larger magnetoresistance (MR), named "colossal" magnetoresistance (CMR), but the effects only occur in a large field and have a strong temperature dependence. The potential of CMR for low-field and room-temperature applications has yet to be determined.

Another promising source of large magnetoresistance effects has been magnetic tunnel junctions (MTJs). Magnetic tunneling structures generally have two magnetic electrodes with different coercivities separated by a very thin insulating layer. A tunneling effect manifests depending upon the relative angles of magnetization of the two ferromagnetic layers. Since the directions of the magnetizations can be altered by an external field, the tunneling resistance is sensitive to the field. According to known theories, a range of field exists where the spins in both electrodes are antiparallel and the tunneling resistance as a function of the magnetic field will be larger. For all other field values, the spins in both electrodes are parallel and the resistance will have a lower value.

Although MTJ structures have been studied for more than twenty years, it is only recently that significant changes in MR (~20–30% at room temperature) have been observed, for absolute resistance values in the 10$^2$ kilo-ohm range for micron-size devices. All the structures studied that have yielded high MR values at room temperature, consist of polycrystalline magnetic layers separated by a thin aluminum oxide insulating layer. Different magnetic materials and/or shapes have been employed to create the two different anisotropys in some cases. Other devices have employed an antiferromagnetic layer to pin one of the ferromagnetic layers.

For example, U.S. Pat. No. 5,835,314 to Moodera, which is hereby incorporated by reference, discloses a magnetic tunneling junction 20 comprising a substrate 22, a seeding layer 24, a first ferromagnetic layer 12, an insulating tunnel barrier layer 14, and a second ferromagnetic layer 10. The first ferromagnetic material layer is formed of Cobalt Iron and the second ferromagnetic material layer is formed of either Cobalt or Nickel Iron. The insulating tunnel barrier layer is formed of Aluminum Oxide or other nitrides.

U.S. Pat. No. 5,953,248 to Chen, which is hereby incorporated by reference, discloses magnetic tunneling injunction 10 comprising a supporting substrate 11, a magnetoresistive structure 12 supported on the substrate, an electrically insulating material layer 13 positioned on the structure 12 and a magnetoresistive structure 15 positioned on the electrically insulating material layer 13. The magnetoresistive structure 15 comprises an antiferromagnetically coupled multi-layer structure including magnetoresistive layers 17 and 18 having a nonmagnetic conductive layer 19 situated in parallel juxtaposition between the magnetoresistive layers 17 and 18. The magnetoresistive layers 17 and 18 may be single layers of ferromagnetic material such as a layer of Nickel, Iron, Cobalt, or alloys thereof, or alternatively, either of layers 17 and 18 can be a composite ferromagnetic layer, such a layer of Nickel-Iron-Cobalt covering a layer of Cobalt-Iron or three layer structures including layers of Cobalt-Iron and Nickel-Iron-Cobalt and Cobalt-Iron with Cobalt-Iron at the interface with adjacent layers. The magnetoresistive structure 12 is similar to the structure 15 and includes magnetoresistive layers 25 and 26 separated by a non-magnetic conducting layer 27. Chen notes that only the layers 17 and 26, adjacent to the electrically insulating material layer 13, contribute to the magnetoresistance of the magnetic tunneling injunction 10. Chen teaches Aluminum Oxide as an example of the electrically insulating material layer 13.

U.S. Pat. No. 5,793,697 to Scheurelein and U.S. Pat. No. 5,640,343 to Gallagher, which are hereby incorporated by reference, each discloses a magnetic tunneling junction comprising a template layer 15, such as Pt, a initial ferromagnetic layer 16, such as Permalloy (Ni—Fe), an antiferromagnetic layer 18, such as Mn—Fe, a fixed ferromagnetic layer 10, such a Co—Fe or Permalloy, a thin tunneling barrier layer 22 of Alumna ($Al_2O_3$), a soft ferromagnetic layer 24, such as a sandwich of thin Co—Fe with Permalloy, and a contact layer 25, such as Pt.

SUMMARY OF THE INVENTION

An object of the invention is to solve at least the problems and/or disadvantages associated with prior art devices and to provide at least the advantages described hereinafter.

It is an object of the invention to provide a novel magnetic tunneling structure.

It is another object of the invention to provide a magnetic tunneling structure with improved magnetoresistive effect in comparison to conventional magnetic tunneling structures.

It is a still further object of the invention to provide a magnetic tunneling structure with lower absolute electrical impedance in comparison to conventional magnetic tunneling structures.

It is an additional object of the invention to provide a magnetic tunneling structure with a higher degree of polarization of the ferromagnetic layers in comparison to conventional magnetic tunneling structures.

It is another object of the invention to provide a magnetic tunneling structure with a lower tunneling barrier in comparison to conventional magnetic tunneling structures.

It is yet another object of the invention to provide a magnetic tunneling structure reduced in size in comparison to conventional magnetic tunneling structures.

It is a further object of the invention to provide a magnetic tunneling structure having an oxide-free tunneling barrier.

It is a further object to provide a magnetic tunneling structure with reduced oxidation between the ferromagnetic layers and the insulating tunneling barrier layer.

To achieve the above objects, a magnetic tunneling structure is provided that comprises, first and second ferromagnetic layers and an insulating tunneling barrier layer disposed between the first and second ferromagnetic layers, wherein the first ferromagnetic layer is a single crystalline layer and the second ferromagnetic layer is a polycrystalline layer. The single crystalline layer and the polycrystalline layer work in combination to provide two states of magnetization. The multilayer structure may be disposed on a substrate, for example, silicon; however, other materials may also be appropriate.

Further, the insulating tunneling barrier layer is preferably formed of a nitride, for example, boron nitride; however, other materials may also be appropriate. The boron nitride layer is preferably grown on the first ferromagnetic layer, preferably using electron cyclotron resonance-assisted sputtering.

The first and second ferromagnetic layers are preferably formed of the same ferromagnetic material, for example, nickel (Ni), cobalt (Co) or iron (Fe). More preferably, the first ferromagnetic layer is formed of a fcc Co single crystalline layer, while the second ferromagnetic layer is formed of a hcp Co polycrystalline layer. The first ferromagnetic layer may be grown on a copper (Cu) fcc buffer layer or on a single crystal MgO substrate. The second ferromagnetic layer may be grown on the insulating tunneling barrier layer.

To achieve the above objects, a magnetic tunneling structure is also provided comprising first and second ferromagnetic layers and an insulating tunneling barrier layer disposed between the first and second ferromagnetic layers, wherein the insulating tunneling barrier layer is a nitride layer grown directly on the first ferromagnetic layer. The insulating tunneling barrier layer is preferably a boron nitride layer.

The first and second ferromagnetic layers are preferably formed of the same ferromagnetic material, for example, Ni, Co or Fe, but have different crystallographic structures. The first ferromagnetic layer is preferably a single crystalline layer, and the second ferromagnetic layer is preferably a polycrystalline layer. More preferably, the first ferromagnetic layer is formed of a fcc Co single crystalline layer, while the second ferromagnetic layer is formed of a hcp Co polycrystalline layer. The nitride layer is preferably grown on the first ferromagnetic layer, preferably using electron cyclotron resonance-assisted sputtering.

To achieve the above objects, a magnetic tunneling structure is also provided comprising first and second ferromagnetic layers and an insulating tunneling barrier layer disposed between the first and second ferromagnetic layers, wherein the first and second ferromagnetic layers are formed of the same metal, but have different crystallographic structures. Preferably, the first ferromagnetic layer is a single crystalline layer and the second ferromagnetic layer is a polycrystalline layer.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A preferred embodiment of the invention will be described with reference to FIG. 1.

Figure 1:
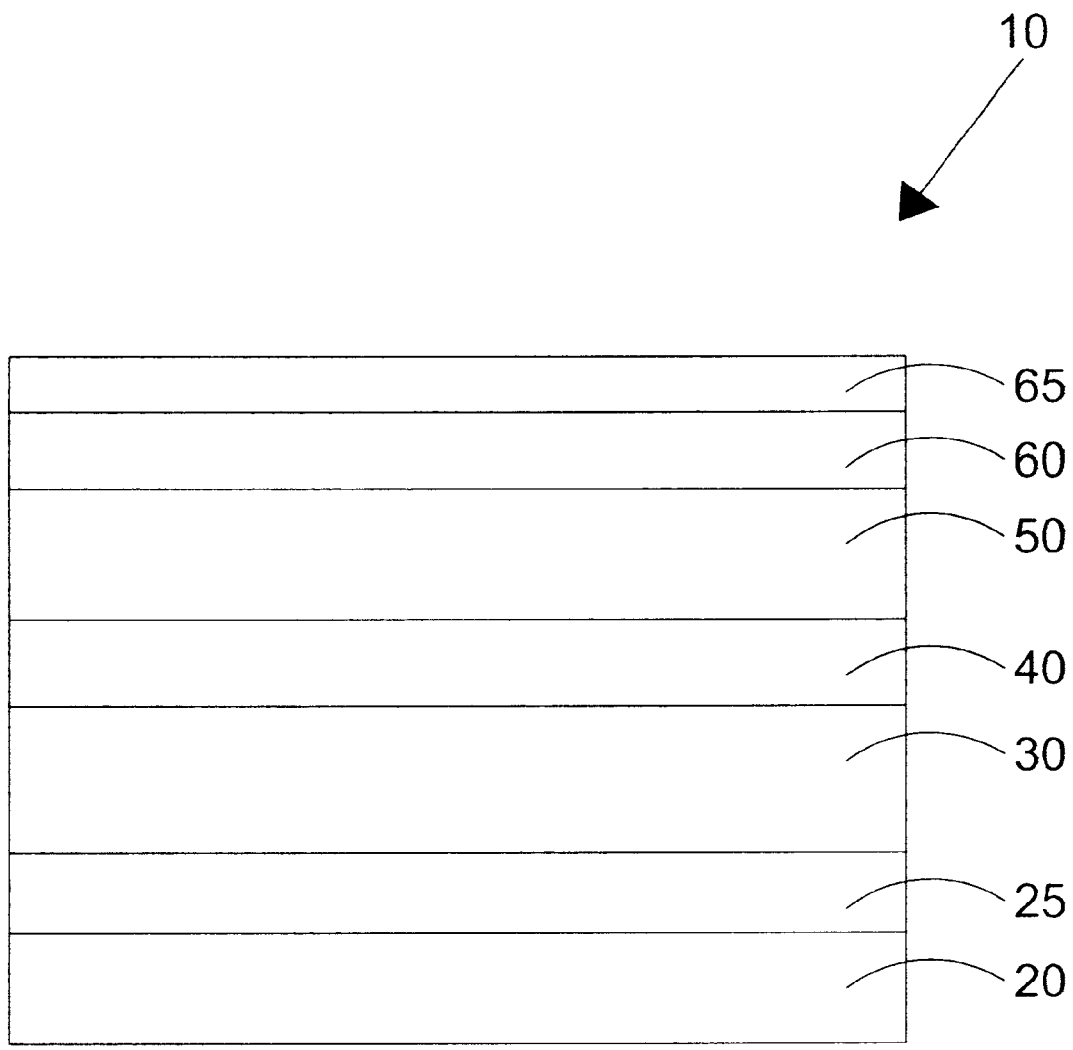
FIG. 1 is a schematic side view of a magnetic tunneling junction according to a preferred embodiment of the invention.

FIG. 1 shows a magnetic tunneling structure 10 comprising a substrate 20, a first ferromagnetic layer 30, a second ferromagnetic layer 50 and an insulating tunneling barrier layer 40 disposed between the first and second ferromagnetic layers 30, 50.

The first and second ferromagnetic layers 30, 50 preferably have different crystallographic properties. For example, the first ferromagnetic layer 30 may be formed of a single crystalline material while the second ferromagnetic layer 50 may be formed of a polycrystalline material. Preferably, the first and second ferromagnetic layers 30, 50 are formed of the same ferromagnetic material, for example, cobalt (Co), nickel (Ni) or iron (Fe); however, other ferromagnetic materials may also be appropriate. The different crystallographic structures of the ferromagnetic materials create the two different anisotropys.

The first ferromagnetic layer 30 preferably has a thickness of approximately 50–100 Å, more preferably approximately 60–100 Å, most preferably approximately 60 Å. The second ferromagnetic layer 50 preferably has a thickness of approximately 60–100 Å, more preferably approximately 70–100 Å, most preferably approximately 70 Å.

The insulating tunneling barrier layer 40 is preferably a nitride layer, for example, a layer of boron nitride (BN); however, other materials may also be appropriate. The nitride layer preferably has a thickness of approximately 10–20 Å, more preferably approximately 15–20 Å, most preferably approximately 15 Å.

The multilayer structure comprised of the first and second ferromagnetic layers 30, 50 and insulating tunneling barrier layer 40 are preferably formed on a substrate 20 by a combination of, for example, molecular beam epitaxy to form the metal layers and electron cyclotron resonance-assisted sputtering to form the insulating tunneling barrier layer; however, other methods of forming the respective layers may also be appropriate. The substrate 20 is formed of, for example, silicon, such as silicon 001 (Si); however, other materials may also be appropriate.

A buffer layer 25 may be provided between the substrate 20 and the first ferromagnetic layer 30, for example, a copper (Cu) single crystal film, to stabilize the first ferromagnetic layer 30. However, other materials may also be appropriate. The Cu single crystalline layer would preferably be grown on the substrate 20 at a rate of approximately 0.3 to 0.4 Å/s in several stages with intermediate annealing to achieve smooth surface. The buffer layer 25 preferably has a thickness of approximately 500–3000 Å. Alternatively, the first ferromagnetic layer may be grown on a single crystal MgO substrate.

Additionally, an antiferromagnetic layer 60, preferably cobalt oxide (CoO), may be formed adjacent to the second ferromagnetic layer 50 for antiferromagnetic biasing of the topmost ferromagnetic layer at low temperatures; however, other materials may also be appropriate for the antiferromagnetic layer. The antiferromagnetic layer 60 preferably has a thickness of approximately 20–30 Å.

The structure may be capped with a layer 65 of non-magnetic metal, for example, Cu for further oxidation protection; however, other materials may also be appropriate. The layer 65 preferably has a thickness of approximately 25–50 Å.

A magnetic tunneling structure was constructed and studied according to the invention. It is described below.

A multilayer system essentially consisting of two Co ferromagnetic films with different crystalline structures separated by an insulating layer was prepared by a combination of molecular beam epitaxy to form the metallic layers and electron cyclotron resonance-assisted sputtering to form the insulating layers. A Cu single-crystalline seed layer having a thickness of approximately 3000 Å was first grown on a Si (001) substrate at a rate of approximately 0.3 Å/s in several stages with intermediate mild annealings to achieve a smooth surface. This Cu single-crystal film grew epitaxially in the (100) orientation with an in-plane rotation angle of approximately 45° with respect to the Si lattice. The Cu single-crystal film served as a template to stabilize the subsequent growth of a fcc Co single-crystal layer. Single crystal Co (100) films exhibit a strong negative fourfold in-plane anisotropy that favors <110> as the easy axis of magnetization. Reflection high-energy electron diffraction (RHEED) oscillations were used to monitor the layer-by-layer growth of the single-crystalline fcc Co layer having a thickness of approximately 60 Å.

An insulating layer of polycrystalline having a thickness of approximately 20–30 Å was then grown using ion-assisted sputtering. Boron nitride has a wide band-gap (approximately 5 eV) comparable to that of aluminum oxide (9 eV), which is the insulating material previously used in magnetic tunneling structures. BN has an important advantage over aluminum oxide ($Al_2O_3$), namely it greatly reduces the partial oxidation of the magnetic layers during the fabrication process.

A second magnetic layer of Co or Ni having a thickness of approximately 60 Å was then deposited in the same manner as the first layer. In the absence of a single-crystal Cu template, this Co layer grew polycrystalline with an hcp structure. The samples were capped with 50 Å of copper to protect them from atmosphere degradation.

Figure 2:
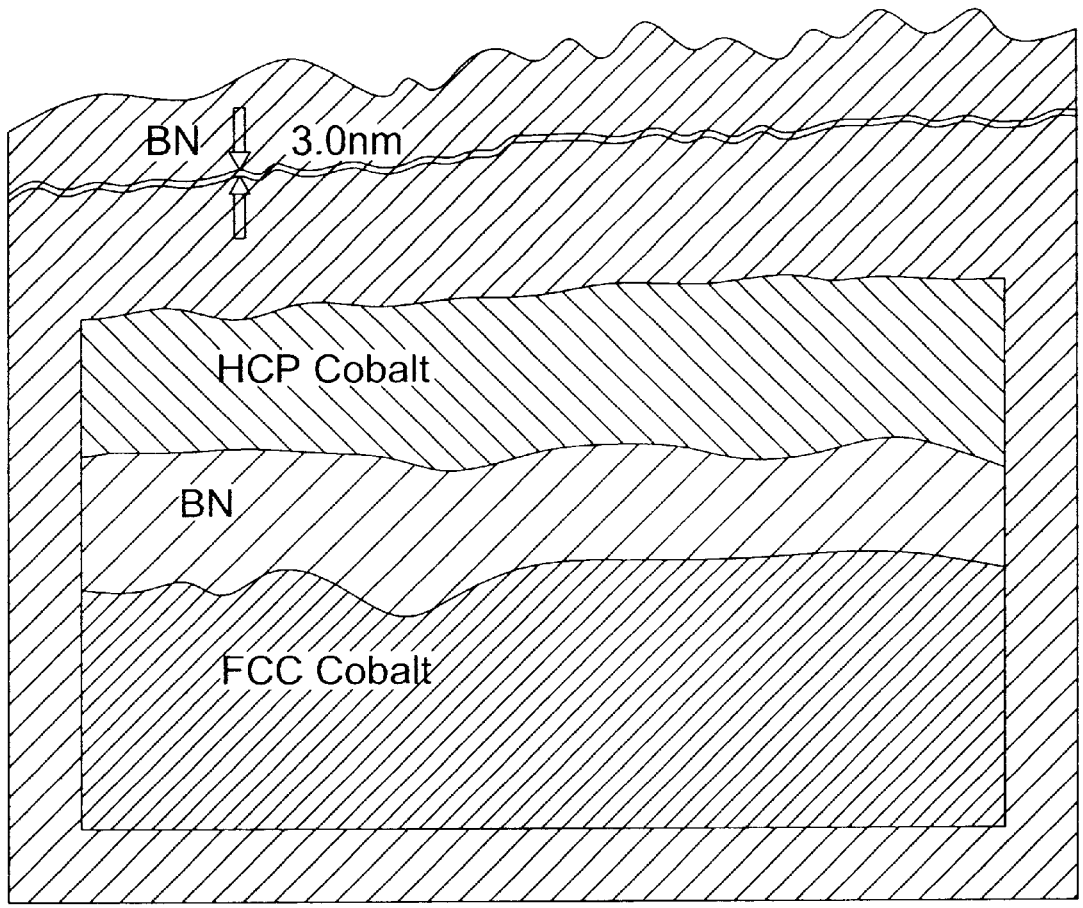
FIG. 2 is a transmission electron microscope (TEM) micrograph showing a cross-section of an exemplary construction of the invention.

FIG. 2 shows a transmission electron microscope (TEM) image illustrating that the insulating layer is continuous and relatively flat, with no observable pinholes. The inset in FIG. 2 shows a high resolution TEM (HRTEM) image of a test sample with the structure confirming the crystallographic structure of the various layers as previously determined by RHEED. Fourier transform analysis of the HRTEM images indicated fcc structure for the initial Cu and Co layers, textured growth (with the basal planes normal to the substrate) for the BN layer, and polycrystalline structure for the second layer (with the hcp structure in the case of Co, and fcc structure for Ni).

Figure 3A:
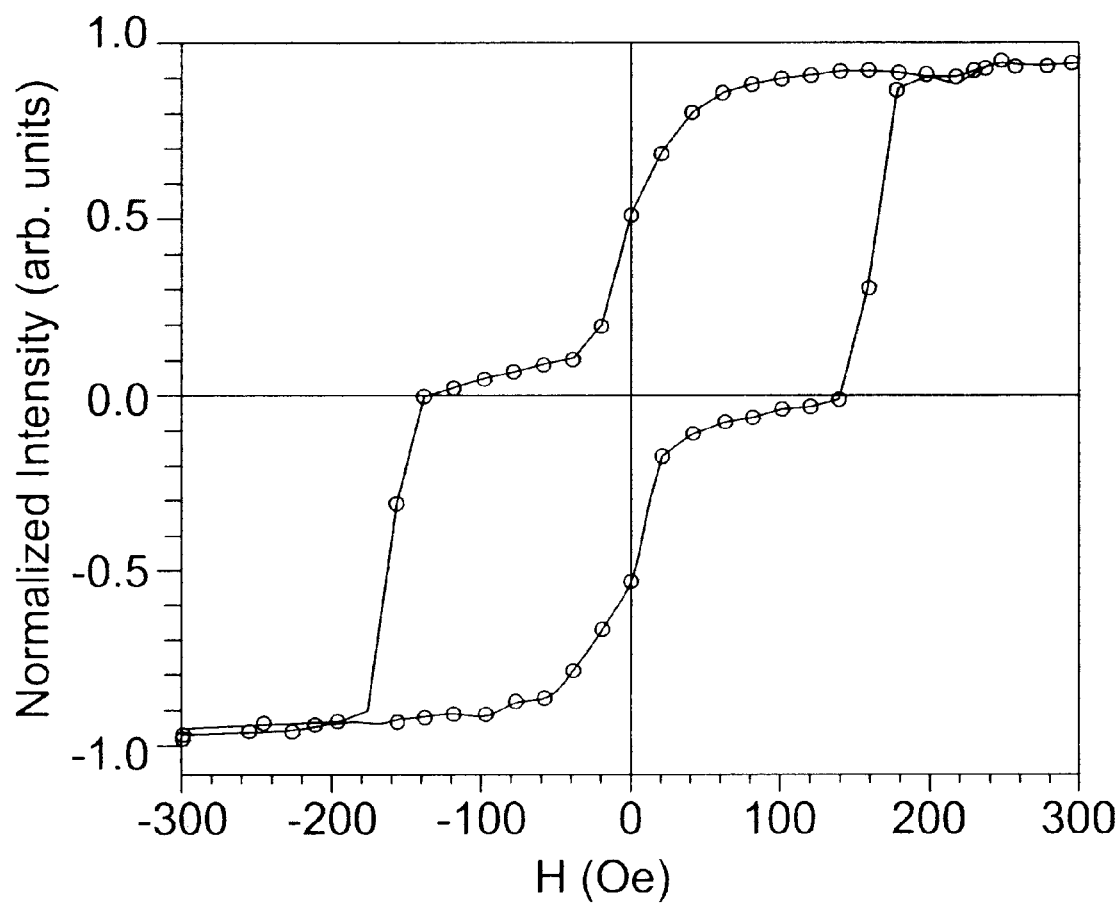
FIG. 3(a) is a graph of a magnetic hysteresis loop at room temperature for an exemplary construction of the invention with $B_{ext}$ applied along the <110> in-plane axis of the single crystal layer.

The process of magnetization reversal was studied using the magneto-optic Kerr effect (MOKE) with the magnetic field $B_{ext}$ applied along the easy <110> in-plane axis of the fcc layer. FIG. 3(a) displays a typical magnetic hysteresis loop (MHL) measured at room temperature.

The magnetization curve exhibits two immediate plateaux corresponding to approximately zero net magnetization where the magnetization vectors of the two electrodes are in the antiparallel configuration. The weak coupling between the magnetic layers permits the identification of the contributions to the MHL from each individual layer. Thus, we observe a sharp flip of the magnetization at higher field (~150 Oe), with square edges in the hysteresis loop, and a more gradual transition at a lower field (~10 Oe), with rounded edges. The sharp transition corresponds to the typical switching along the easy axis for a single crystal, in this case fcc Co, and the smooth magnetization reversal corresponds to the polycrystalline layer (hcp Co or fcc Ni).

Figure 3B:
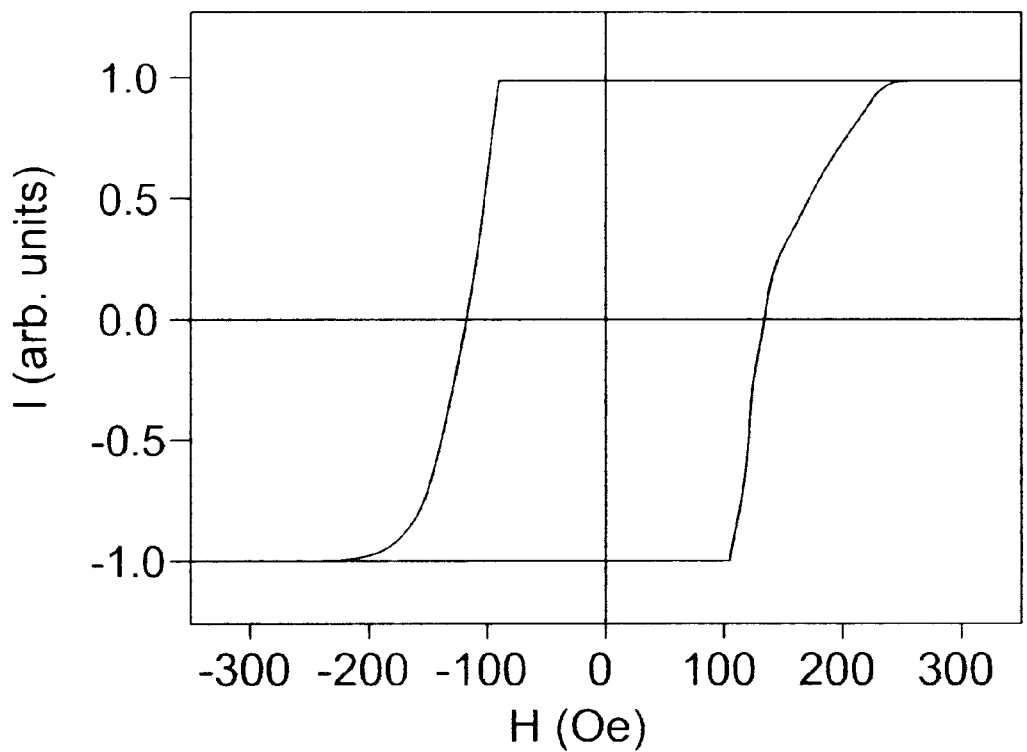
FIG. 3(b) is a graph of a magnetic hysteresis loop at room temperature for an exemplary construction of the invention for contribution from the fcc Co layer with $B_{ext}$ along the <110> axis.
Figure 3C:
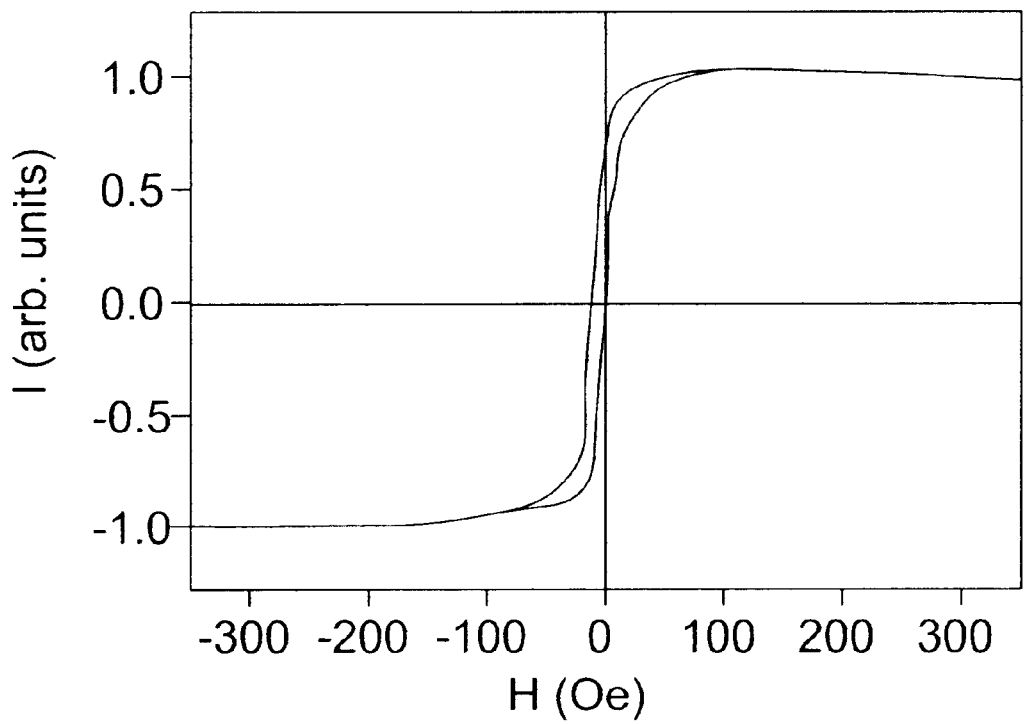
FIG. 3(c) is a graph of a magnetic hysteresis loop at room temperature for an exemplary construction of the invention for contribution from the polycrystalline layer.

We have proposed a single model to predict the coercivity ($H_c$) along the easy axis for an fcc film. In this model the magnetization is allowed to jump between available energy minima in the energy landscape for H—$H_c$ when the gain in energy is greater than the energy necessary for domain-wall nucleation. Thus, our predicted $H_c$ is 150 Oe for the fcc Co electrode (assuming cross-tie domain wall nucleation, $2K_1/M_S$ from a paper by Naik et al. and bulk value for the saturation magnetization) in agreement with the observed value. See Naik et al., Phys. Rev. B 48, 1008 (1993), which is hereby incorporated by reference. The details of this model can be found elsewhere. For polycrystalline materials the magnetization curve is the result of an average over different oriented crystallites. In addition, the crystalline boundaries act as obstacles to domain motion, or for domain rotation, and the hysteresis loop should have a rounded appearance. We observe that the coercive field of the polycrystalline layer is similar to that for bulk materials (~2 Oe for Ni, ~9 Oe for Co, at ambient temperature). The hysteresis loops for the individual layers were also measured (See FIGS. 3(b) and 3(c)) and further confirmed our identification of the components in the composite loop.

An added advantage of this type of sample is the presence of well defined easy and hard axes arising from the crystallographic symmetry given by the in-plane fourfold symmetry of the single crystal fcc layer. Further magnetic characterization at temperatures ranging from approximately 5 to 350 K was performed using a Quantum Design superconducting quantum interference device (SQUID) magnetometer, as later discussed. These measurements confirmed the MOKE data at room temperature.

The samples were patterned lithographically to obtain junctions of square shape with side lengths ranging from approximately 20 to 200 μm to minimize the contributions to the resistance that are not magnetic field dependent. Transport properties were measured applying a dc voltage at room temperature, using a two-probe technique. The parabolic behavior of the conductive vs voltage curve obtained was considered a signature of tunneling. From a fit of the Simmons model to the current-voltage (I–V) curve near zero, we found that the effective thickness and height of the BN barrier were approximately 1.4 nm and approximately 1.25 eV respectively. See J. G. Simmons, J. Appl. Phys. 34, 1793 (1963), which is hereby incorporated by reference.

Figure 4:
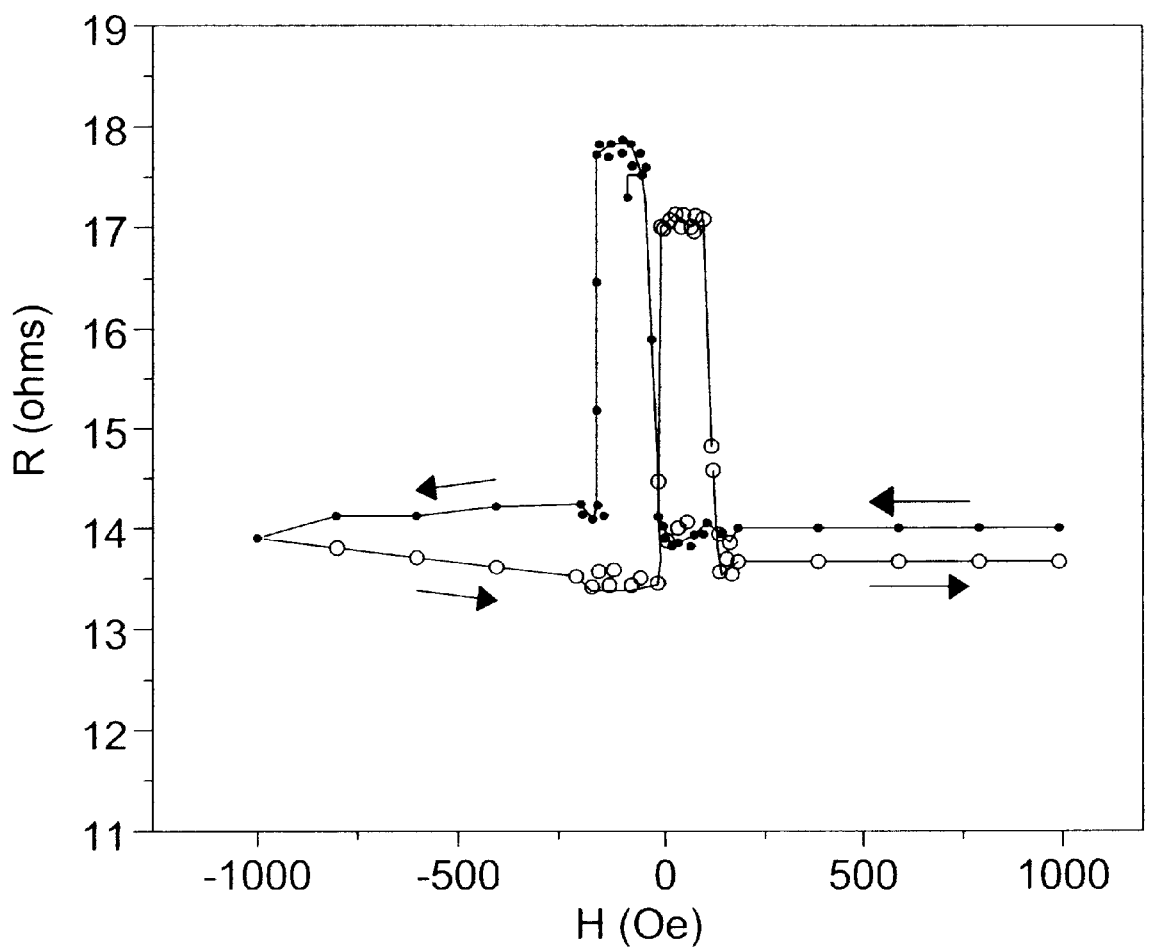
FIG. 4 is a graph of room temperature magnetoresistance of an exemplary construction of the invention with $B_{ext}$ applied along the easy <110> in-plane axis of the fcc single crystal layer.

The barrier height value for BN appears to be somewhat lower than that reported for aluminum oxide junctions implying that the absolute resistance values of MTJs according to the invention should also be lower than those previously reported for $Al_3O_2$ junctions. Our measurements support this. FIG. 4 shows the magnetoresistance of one of these samples (Co fcc bottom electrode, Ni polycrystal top electrode, junction size approximately 50 μm×50 μm). A sharp 25% change in the magnetoresistance was observed at room temperature, at the same fields where the switching of the magnetization was observed in the hysteresis loop. The magnetotunneling effect thought be operative can be explained using a model proposed by Tedrow and Meservey in Phys. Rep. 238, p. 73, 1994 (1), which is hereby incorporated by reference. This model considers the asymmetry in the density of states of the majority and minority energy bands in a ferromagnet and assumes that the spin is conserved during the tunneling process. The magnetoresistance ratio is given by Equation (1) as follows:

$$\frac{\Delta R}{R_p} = \frac{R_{ap}}{R_p} - 1 = \frac{2P_1 P_2}{1 - P_1 P_2} \quad (1)$$

where $R_{ap}$ is the resistance of the junction with antiparallel alignment of the magnetizations in the two FM electrodes, and $R_p$ is the resistance with the magnetizations aligned parallel. $P_1$ and $P_2$ are the spin polarization coefficients of electrodes 1 and 2, respectively. Other theories have been proposed to extend the previous model and make it more rigorous. Slonczewski predicts that the barrier height and the character of the FM-I interface should also have an influence on the MR. See J. C. Slonezewski, Phys. Rev. B 39, 6995 (1988), which is hereby incorporated by reference.

From application of Equation (1) we expect an optimum magnetoresistance ratio of approximately 28% for Co—Co samples and approximately 17.5% for Co—Ni samples ($P_{Co}$=0.35±0.03, $P_{Ni}$=0.23±0.03 from Upadhyay's paper. Surprisingly the observed change (~25%) is somewhat larger than the maximum value expected within the experimental uncertainties associated with $P_{Co}$ and $P_{Ni}$ mentioned in Upadhyay's paper, for samples using aluminum oxide as tunneling barriers. On the other hand, Upadhyay et al. have recently used Andrew reflection to measure the spin polarization of the direct current in FM-superconductor thin films prepared with abrupt oxide-free interfaces. See S. K. Upadhyay et al., Phys. Rev. Lett. 81, 3247 (1998), which is hereby incorporated by reference. They report polarization values of $P_{Co}$=0.37 and $P_{Ni}$=0.32, and attribute the difference between these values and those of Tedrow and Meservey to the fact that their measurements relate to the polarization in the bulk current rather than being influenced by interface effects, as could be the case in the tunneling measurements. Using values of Upadhyay in Eq. (1) we get a magnetoresistance ratio of approximately 27%, in better agreement with our experimental value. Thus, our results seem to indicate that the spin-polarized tunneling in our samples is also determined by a high degree of polarization in the ferromagnetic layers. The absence of oxidation processes that may also oxidize the ferromagnetic surface in contact with the insulating layer thus preserves the magnetic character of the interface.

In summary, we have used epitaxial growth techniques to impose in-plane magnetocrystalline anisotropy on structures intended for spin-tunneling applications. The samples consisted of two MBE-deposited magnetic layers with different magnetic properties due to their different crystallographic structure, providing well-defined and separated values of Hc. One layer was grown as single crystalline fcc Co while the other magnetic layer was polycrystalline (hcp Co or fcc Ni). This approach has the added advantage of the presence of easy and hard axes arising from the in-plane fourfold anisotropy of the single crystal fcc Co layer. The use of BN as a barrier layer avoids potential oxidation problems at the FM-1 interface, implying spin-polarization values that agree with those measured recently by Andreev reflection techniques. Moreover, the apparently smaller barrier height of the BN insulating layer is favorable for lowering the absolute resistance of magnetic tunnel junctions.

Another sample was made similar to the first sample; however the top surface of this hcp Co layer was oxidized forming a thin CoO layer before being capped by a layer of Cu, preferably having a thickness of approximately 30 Å.

An ex situ transmission electron microscopy (TEM) image of this multilayer structure showed that the insulating layer was continuous with no observable pinholes. High resolution TEM (HRTEM) confirmed the crystallographic structure of the various layers as previously determined by RHEED. Fourier transform analysis of the HRTEM images indicated an fcc structure for the initial Cu and Co layers, polycrystalline columnar growth for the BN layer, and an hcp polycrystalline structure with some degree of texture for the second Co layer.

Figure 5:
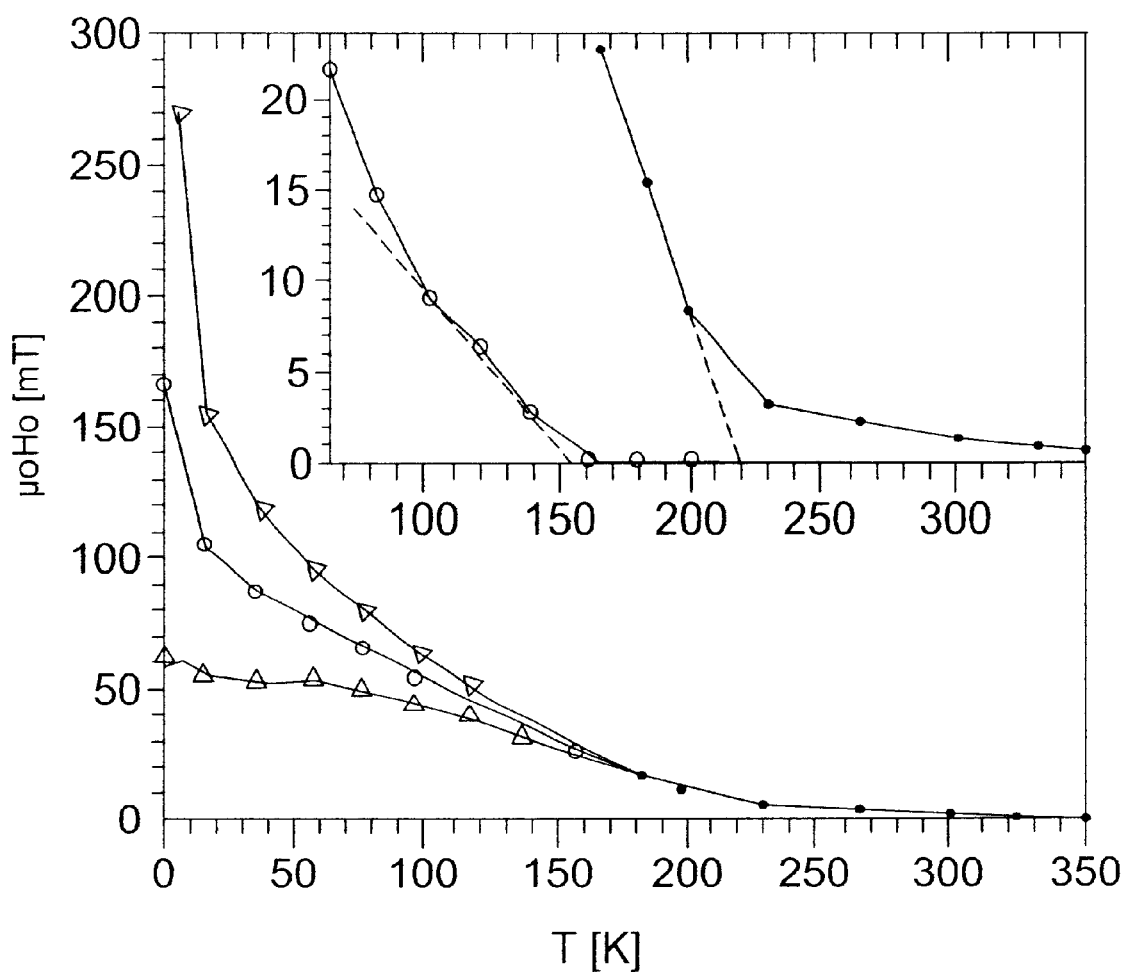
FIG. 5 is a graph of magnetic hysteresis loops (MHLs) for an exemplary construction of the invention at 5, 60 and 160K after cooling from 390K down to 5K in a field of 2T while the inset in FIG. 2 shows details of low-field MHLs at 5, 160 and 265K.

The process of magnetization reversal of this multilayered system was studied using a Quantum Design superconducting quantum interference device magnetometer at temperatures ranging from 5 to 350 K with the magnetic-field $B_{ext}$ applied along the easy <1 10> in-plane axis of the fcc Co. The typical sample size was approximately 5×5 $mm^2$. FIG. 5 is a graph of several magnetic hysteris loops (MHLs) measured after cooling from approximately 390 to 5 K in a magnetic field of approximately 2 T. These MHLs exhibit a complex shape, which is strongly dependent on temperature with the hysteresis becoming wider and more nonsymmetrical at lower temperatures.

The nonsymmetric MHL characteristic is more noticeable after the sharp flipping of the magnetization which occurs at fields $B_{ext}=\pm B_{flip}$. In addition, this nonsymmetric behavior is strongly dependent upon the cooling field, and could be due to an exchange bias from the antiferromagnetic layer pinning the ferromagnetic layer. Since the antiferromagnetic CoO layer is adjacent to the hcp Co layer, it is reasonable to assume that this part of the MHL is associated with the hcp Co layer. In contrast, the sharp flipping of the magnetization which is more clearly seen in the insert of FIG. 5 (see the curved dashed arrows), is nearly temperature independent. $B_{flip}$ is approximately 14 mT for temperatures below ~100 K and increases to about ~16 mT at ~300K. MHLs measured at higher temperatures, up to ~350 K, are very similar to the loop at ~265K except for a slight decrease in the saturation magnetic moment $m_s$ with increasing temperature. The $m_s$ decreased by ~4% from ~5 to 250 K and ~8.8% up to ~350 K. The abrupt jump being about ~45% of $m_s$. Since the nominal thickness of the fcc Co layer is approximately 60 Å out of a total Co thickness of approximately 130 Å, or ~46% of the total thickness, these jumps correspond to the switching of the magnetization vector in the fcc single-crystalline Co layer.

Figure 6:
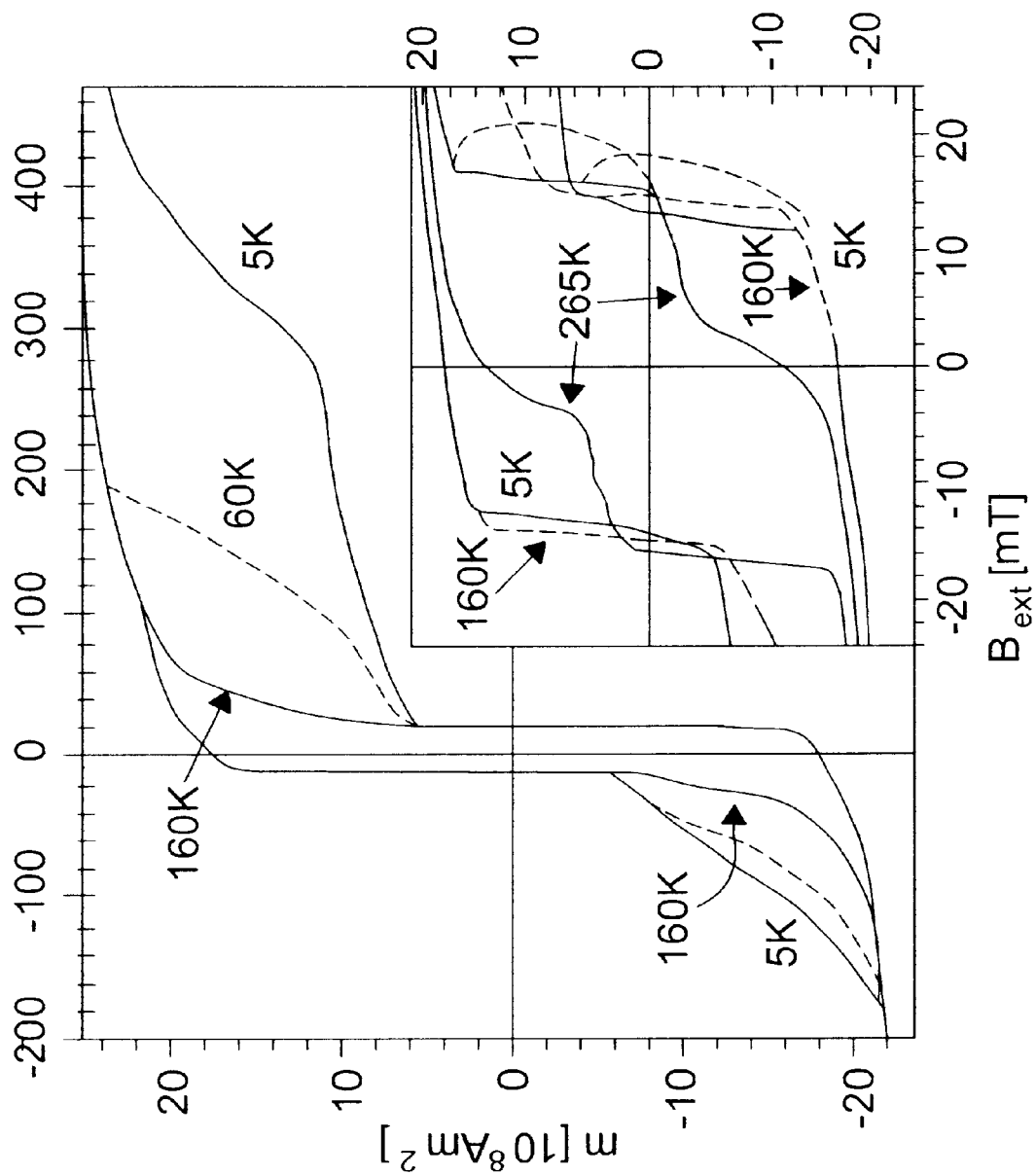
FIG. 6 is a graph of magnetic hysteresis loops associated with the hcp Co layer of the exemplary construction of the invention at 5, 60, 120, 160, 180 and 330K.

The observation of two distinct, characteristic behaviors in the magnetization reversal permit the identification of the contributions to the MHLs from each individual Co layer. The sharp flip of the magnetization in the fcc Co layer can be easily distinguished, particularly at lower temperatures. By shifting the MHLs on either side of the jumps in the magnetization so that the MHL branches below and above the jumps point towards each other, the resulting MHLs can be attributed to the hcp Co layer only. The magnitude of these shifts were scaled with $m_s(T)$. The resulting MHLs exhibit a nearly archetypal shape with very low coercivity above approximately 200 K while the MHLs at lower temperatures are wide and asymmetrical as shown in FIG. 6. The vertical dashed lines indicative the location where these MHLs were "sewed up" after subtraction of the contribution from the fcc Co layer. The smooth shape of these MHLs is also consistent with properties expected for the polycrystalline structure of this Co layer and that the subtraction of the sharp contribution from the fcc Co layer was a reasonable approximation. In addition, the lower branches of the MHLs in FIG. 6 exhibit a smooth S-shape step close to the field of magnetization reversal in the fcc Co layer with a similar S shape being only partially visible on the upper MHL branches. This feature can be explained by a finite ferromagnetic Neel coupling between the two Co layers.

Figure 7:
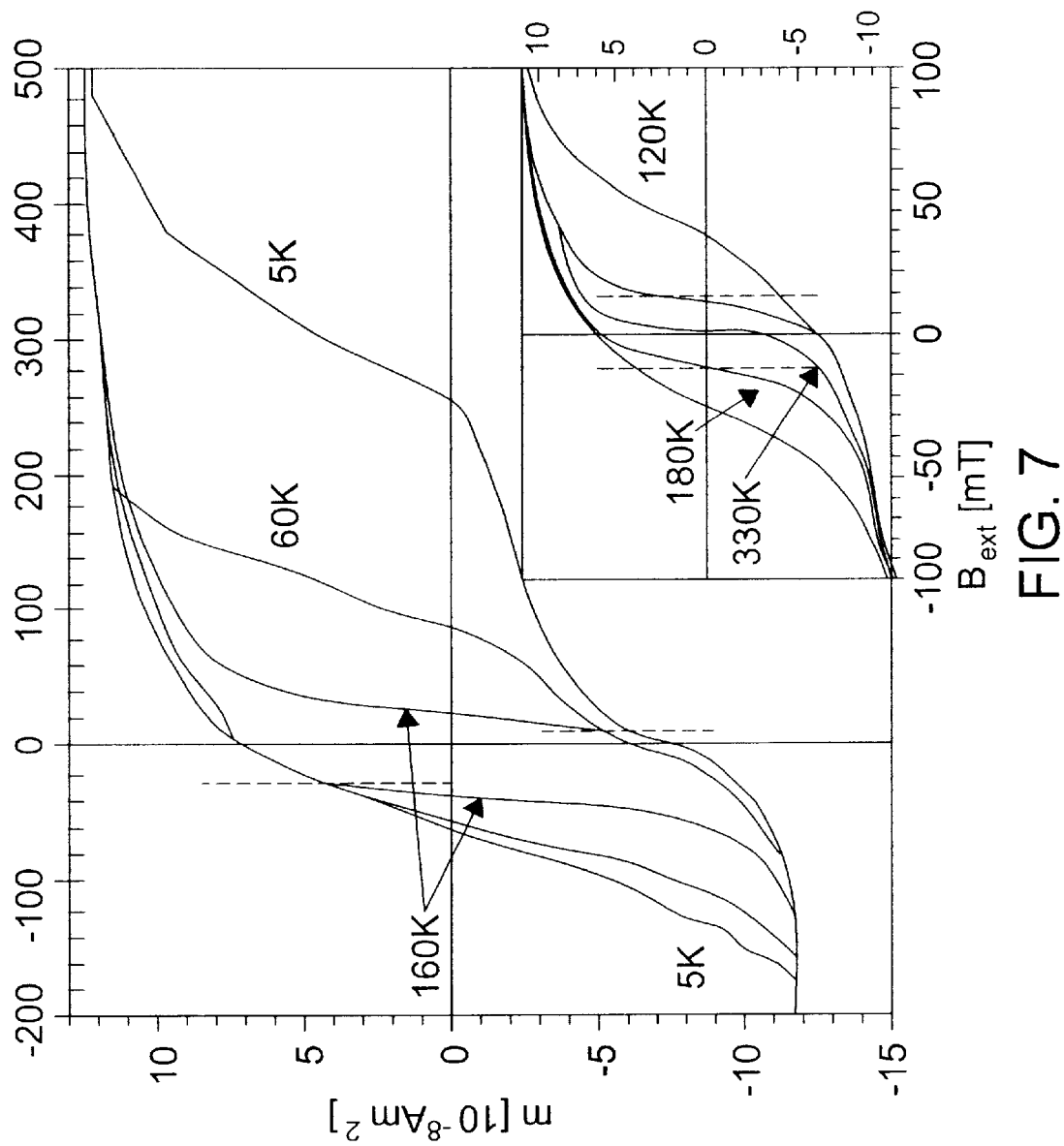
FIG. 7 is a graph of temperature dependance of the coercive field of the polycrystalline hcp Co layer when antiferromagnetically biased with cobalt oxide.

The temperature dependance of the coercive field $\mu_0 H_C$ in the hcp Co layer is displayed in FIG. 7. $\mu H_C(T)$ is a just few mT at the higher temperatures and increases sharply below approximately 220 K due to the interaction with the adjacent CoO layer. In addition to the increasing coercivity, the MHLs begin to be asymmetrical below 150 K resulting in different coercive field for each MHL branch, which are shown in FIG. 7 as $\mu_0 H_c^-$ and $\mu_0 H_c^+$ along with the average coercive field, $$\frac{(\mu_0 H_c^- + \mu_0 H_c^+)}{2} \quad (2)$$

in FIG. 7. This difference, or correspondingly, the MHL offset shown as $$\frac{(\mu_0 H_c^- - \mu_0 H_c^+)}{2} \quad (3)$$

in the insert in FIG. 7, arises from the exchange-coupled antiferromagnetic Co layer being polarized by cooling in the presence of a magnetic field. A similar temperature dependence has been previously observed in a Co—CoO system.

As discussed above, the magnetic hysteresis loops exhibited two distinct, characteristic behaviors in the magnetization reversal, which permit the identification of the contributions to the MHLs from each individual Co layer. The single-crystalline fcc Co layer exhibited a nearly ideal switching of the magnetization when the field was applied along the easy axis. The coercive field changed only slightly between approximately 4 and 16 mT in the temperature range between approximately 5 and 350 K. In contrast, the magnetization of the hcp Co layer changed smoothly within a wide field range due to its polycrystalline structure. Moreover, the magnetic behavior of the hcp Co layer was further modified by the exchange coupling with an adjacent antiferromagnetic CoO layer, which significantly enhanced the coercivity at low temperatures. The coercive field of the hcp Co layer in the high-temperature range was a few mT and increased sharply below ~220 K reaching ~150 mT at ~5 K. The MHLs of the hcp Co layer start to be asymmetrical below ~150 K and the offset becomes greater than ~100 mT at ~5K.

The present invention provides a novel magnetic tunneling structure where the magnetic resistive effect due to the spin-dependent tunneling occurs between two magnetic layers with different coercivity because of the crystallographic properties. Further, the use of boron nitride leads to higher polarization values of the ferromagnetic layers, leading to larger magnetoresistive effects (approximately 25% or larger) at room temperature. Additionally, the boron nitride insulating layer is grown on a single crystal structure. This process of deposition of the boron nitride layer results in a smooth, continuous, pin-hole free, highly textured insulating layer, providing lower impedance.

In summary, the invention provides at least the following benefits over conventional magnetic tunneling structures: 1) oxide free tunneling barriers; 2) lower absolute electrical impedance; and 3) lower tunneling barriers which allows for a reduction in size of the device by an order of magnitude for the same device impedance. Further, the use of non-oxide material eliminates oxidation of ferromagnetic layers at the interface allowing higher polarization. Additionally, the higher degree of polarization of the ferromagnetic layers provided by the invention leads to larger magnetoresistive effect.

This invention should be particularly useful for hard drive disk technology, which continues to experience dramatic increases in aerial density for stored information. The invention is also applicable to any device where magnetic sensing on a very small scale is desired.

The foregoing embodiments and advantages are merely exemplary and are not to be construed as limiting the present invention The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A magnetic tunneling structure, comprising:
   first and second ferromagnetic layers; and
   an insulating tunneling barrier layer disposed between the first and second ferromagnetic layers, wherein the first ferromagnetic layer is a single crystalline layer and the second ferromagnetic layer is a polycrystalline layer, the single crystalline layer and the polycrystalline layer working in combination to provide two states of magnetization.

2. The magnetic tunneling structure according to claim 1, wherein the insulating tunneling barrier layer is formed of a nitride.

3. The magnetic tunneling structure according to claim 2, wherein the second ferromagnetic layer is grown on the insulating tunneling barrier layer.

4. The magnetic tunneling structure according to claim 2, wherein the insulating tunneling barrier layer is formed of boron nitride.

5. The magnetic tunneling structure according to claim 4, wherein the boron nitride layer is grown on the first ferromagnetic layer.

6. The magnetic tunneling structure according to claim 5, wherein the boron nitride layer is formed on the first layer using electron cyclotron resonance-assisted sputtering.

7. The magnetic tunneling structure according to claim 4, wherein the layer of boron nitride has a thickness of approximately 10–20 Å.

8. The magnetic tunneling structure according to claim 7, wherein the layer of boron nitride has a thickness of approximately 15 Å.

9. The magnetic tunneling structure according to claim 1, wherein first and second ferromagnetic layers are formed of the same ferromagnetic material.

10. The magnetic tunneling structure according to claim 1, wherein the first ferromagnetic layer is formed of at least one of nickel, cobalt and iron.

11. The magnetic tunneling structure according to claim 10, wherein the first ferromagnetic layer is a fcc cobalt single crystalline structure.

12. The magnetic tunneling structure according to claim 10, wherein the first ferromagnetic layer is grown on a copper fcc buffer layer.

13. The magnetic tunneling structure according to claim 1, further comprising a substrate.

14. The magnetic tunneling structure according to claim 13, wherein the substrate is formed of Si (001).

15. The magnetic tunneling structure according to claim 1, wherein the second ferromagnetic layer is formed of at least one of nickel, cobalt and iron.

16. The magnetic tunneling structure according to claim 15, wherein the second ferromagnetic layer is a hcp cobalt polycrystalline layer.

17. A magnetic tunneling structure, comprising:

first and second ferromagnetic layers; and an insulating tunneling barrier layer disposed between the first and second ferromagnetic layers, wherein the insulating tunneling barrier layer is a hcp boron nitride layer grown directly on the first ferromagnetic layer.

18. The magnetic tunneling structure according to claim 17, wherein the layer of boron nitride has a thickness of approximately 10–20 Å.

19. The magnetic tunneling structure according to claim 18, wherein the layer of boron nitride has a thickness of approximately 15 Å.

20. The magnetic tunneling structure according to claim 17, wherein the nitride layer is grown on the first ferromagnetic layer using electron cyclotron resonance-assisted sputtering.

21. A magnetic tunneling structure, comprising:

first and second ferromagnetic layers; and an insulating tunneling barrier layer disposed between the first and second ferromagnetic layers, wherein the insulating tunneling barrier layer is a nitride layer grown directly on the first ferromagnetic layer, and wherein the first and second ferromagnetic layers are formed of the same ferromagnetic material, but have different crystallographic structures.

22. The magnetic tunneling structure according to claim 21, wherein the first ferromagnetic layer is a single crystalline layer.

23. The magnetic tunneling structure according to claim 22, wherein the first ferromagnetic layer is a fcc cobalt single crystalline layer.

24. The magnetic tunneling structure according to claim 21, wherein the first and second ferromagnetic layers are formed of at least one of nickel, cobalt and iron.

25. The magnetic tunneling structure according to claim 21, wherein the second ferromagnetic layer is a polycrystalline layer.

26. The magnetic tunneling structure according to claim 25, wherein the second ferromagnetic layer is a hcp cobalt polycrystalline layer.

27. A magnetic tunneling structure, comprising:

first and second ferromagnetic layers; and an insulating tunneling barrier layer disposed between the first and second ferromagnetic layers, wherein the first ferromagnetic layer is a single crystalline layer and the second ferromagnetic layer is a polycrystalline layer.

28. The magnetic tunneling structure according to claim 27, wherein the first and second ferromagnetic layers are formed of the same ferromagnetic material.

29. A magnetic tunneling structure, comprising:

first and second ferromagnetic layers; and an insulating tunneling barrier layer disposed between the first and second ferromagnetic layers, wherein the first ferromagnetic layer is a single crystalline layer and the second ferromagnetic layer is a polycrystalline layer, and wherein the first and second ferromagnetic layers work in combination to provide two states of magnetization.

30. A magnetic tunneling structure, comprising:

a first ferromagnetic layer having a first crystallographic structure with a first symmetry;

a non-magnetic spacer disposed on the first ferromagnetic layer, wherein the crystallographic structure of the non-magnetic spacer is determined by the crystallographic structure of the first ferromagnetic layer; and a second ferromagnetic layer disposed on the non-magnetic spacer, wherein the second ferromagnetic layer has a second crystallographic structure with a second symmetry.

31. The magnetic tunneling structure of claim 30, wherein the first ferromagnetic layer is a single crystalline layer and the non-magnetic spacer is a polycrystalline layer.

32. The magnetic tunneling structure of claim 31, wherein the second ferromagnetic layer is a polycrystalline layer.

33. The magnetic tunneling structure of claim 30, wherein said non-magnetic spacer is grown on said first ferromagnetic layer and said first symmetry is sufficiently high that said non-magnetic spacer comprises polycrystalline material.

34. The magnetic tunneling structure of claim 30, wherein the second symmetry is higher than the first symmetry.

35. The magnetic tunneling structure of claim 30, wherein the first symmetry is determined by the substrate material.

36. The magnetic tunneling structure of claim 30, wherein the second symmetry is determined by symmetry of the non-magnetic spacer.

* * * * *